United States Patent
Smith et al.

(10) Patent No.: US 9,264,652 B2
(45) Date of Patent: Feb. 16, 2016

(54) HOME AND NETWORK VIDEO CACHING

(75) Inventors: Donald E. Smith, Lexington, MA (US); James Di Mattia, Churchville, MD (US); Xue Li, Basking Ridge, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 663 days.

(21) Appl. No.: 12/846,901

(22) Filed: Jul. 30, 2010

(65) Prior Publication Data

US 2012/0030721 A1  Feb. 2, 2012

(51) Int. Cl.
| | |
|---|---|
| *H04N 5/76* | (2006.01) |
| *H04N 5/782* | (2006.01) |
| *H04N 9/82* | (2006.01) |
| *H04N 21/433* | (2011.01) |
| *H04N 21/4335* | (2011.01) |
| *H04N 21/442* | (2011.01) |

(52) U.S. Cl.
CPC ........... *H04N 5/782* (2013.01); *H04N 21/4334* (2013.01); *H04N 21/4335* (2013.01); *H04N 21/44204* (2013.01); *H04N 21/44245* (2013.01); *H04N 5/76* (2013.01); *H04N 9/8205* (2013.01)

(58) Field of Classification Search
CPC .................... H04N 21/44245; H04N 21/4335; H04N 21/44204; H04N 21/4334; H04N 5/782; H04N 5/76; H04N 9/8205
USPC ........................................ 725/88–89; 386/295
See application file for complete search history.

(56) References Cited

U.S. PATENT DOCUMENTS

| | | | | |
|---|---|---|---|---|
| 7,877,765 | B2* | 1/2011 | Bhogal et al. | 725/21 |
| 8,037,502 | B1* | 10/2011 | Kim | 725/87 |
| 2002/0174430 | A1* | 11/2002 | Ellis et al. | 725/46 |
| 2003/0023745 | A1* | 1/2003 | Noe | 709/235 |
| 2003/0204848 | A1* | 10/2003 | Cheng et al. | 725/58 |
| 2004/0258396 | A1* | 12/2004 | Nakamura et al. | 725/58 |
| 2005/0050578 | A1* | 3/2005 | Ryal | 725/143 |
| 2005/0080497 | A1* | 4/2005 | Rao | 700/94 |
| 2005/0213448 | A1* | 9/2005 | Takahashi | 369/47.12 |
| 2005/0238315 | A1* | 10/2005 | Kataoka | 386/46 |
| 2005/0271363 | A1* | 12/2005 | Tanikawa | 386/83 |
| 2007/0078910 | A1* | 4/2007 | Bopardikar | 707/204 |
| 2007/0104456 | A1* | 5/2007 | Craner | 386/83 |
| 2007/0118848 | A1* | 5/2007 | Schwesinger et al. | 725/9 |
| 2007/0244749 | A1* | 10/2007 | Speiser et al. | 705/14 |
| 2008/0086536 | A1* | 4/2008 | Seki et al. | 709/211 |
| 2009/0100478 | A1* | 4/2009 | Craner et al. | 725/87 |
| 2009/0113472 | A1* | 4/2009 | Sheth et al. | 725/34 |
| 2009/0265743 | A1* | 10/2009 | Gao | 725/94 |
| 2009/0328115 | A1* | 12/2009 | Malik | 725/93 |
| 2010/0174804 | A1* | 7/2010 | Sonoyama | 709/219 |

\* cited by examiner

Primary Examiner — Randy Flynn

(57) ABSTRACT

A method may include storing a number of programs on a digital video recorder (DVR) and assigning a score or ranking to each of the programs. The method may also include receiving a request to store another program on the DVR and determining whether the DVR has adequate storage space for the other program. The method may further include forwarding, when the DVR does not have adequate storage space for the other program, one of the programs having a lowest score or ranking to a secondary storage located remotely from the DVR.

19 Claims, 9 Drawing Sheets

HOME AND NETWORK VIDEO CACHING

BACKGROUND INFORMATION

Service providers offer customers a wide range of video-related services, such as a large number of programming channels, as well as video-on-demand programming. In addition, service providers offer customers digital video recorders (DVRs) that allow the customers to record and store video programming for watching at a later time.

The storage space on the DVR limits the number of programs that a customer can record. As a result, customers that record a significant amount of programming face the frequent chore of deleting old programs to make sure that the DVR has adequate storage space for new programming that has been selected for recording. Customers, however, often forget to clear storage space on the DVR or inadvertently delete a recorded program that has not been watched. Such problems lead to customer frustration and dissatisfaction with respect to use of the DVR.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to managing storage space available for recording programming. In one exemplary implementation, one or more storage management devices actively manage the storage of programming selected by a customer and move programming from a primary cache located at the customer's home to a secondary cache located externally from the customer's home, and vice versa. In such an implementation, the storage management device may assign scores to stored programming or rank stored programming based on a likelihood or probability that the program will be viewed at a later time. When primary cache space is full, the management device may move programs having lower scores/rankings to the secondary cache to make room for new programming. The management device may also move programming between the primary and secondary caches to minimize traffic on the network during peak traffic times.

Figure 1:
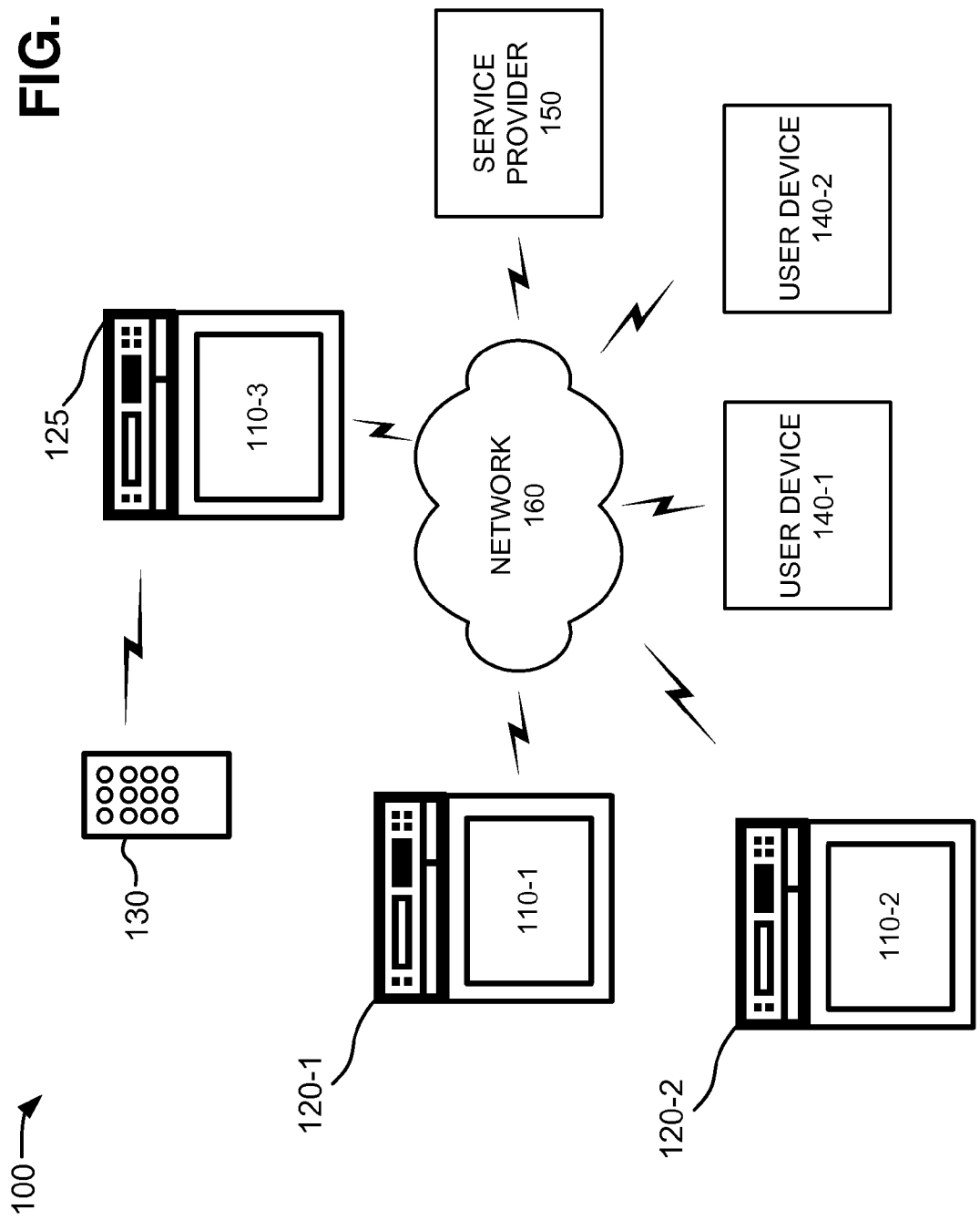
FIG. 1 illustrates an exemplary network in which systems and methods described herein may be implemented.

FIG. 1 is a diagram of an exemplary network 100 in which systems and methods described herein may be implemented. As illustrated, network 100 may include televisions (TVs) 110-1 to 110-3 (collectively "televisions 110" and individually "television 110"), STBs 120-1 and 120-2 (collectively "STBs 120" and individually "STB 120"), a digital video recorder (DVR) 125, a remote control 130, user devices 140-1 and 140-2 (collectively "user devices 140" and individually "user device 140"), a service provider 150 and network 160. Components of network 100 may interconnect via wired and/or wireless connections.

Televisions 110 may include any display device capable of displaying video content provided by STB 120, DVR 125, and/or content provided by other devices (e.g., a digital video disk (DVD) player, a video camera, a home media player, etc., not shown) connected to television 110. The term "program" as used herein should be construed to include any content provided by a service provider, such as television programming (e.g., TV shows, movies, sports, etc.), video on demand content, Internet protocol television, etc.

STBs 120 and DVR 125 may include devices that receive television programming (e.g., from service provider 150), and provide the television programming to television 110 or another device. STBs 120 and DVR 125 may allow users to select the programming provided to television 110 based on a signal (e.g., a channel up or channel down signal, etc.) from remote control 130 and/or user device 140. Furthermore, DVR 125 may record video in a digital format to a disk drive or other memory medium within DVR 125. In one exemplary implementation, features of STBs 120 and/or DVR 125 may be incorporated directly within televisions 110. Consistent with implementations described herein, STBs 120 and DVR 125 may be configured to display content stored on another one of STBs 120 and/or DVR 125. This feature may be referred to as a "multi-room DVR" (MDVR). The terms "set top box" and "digital video recorder" as used herein should be construed to include any device used to receive signals from an external source and output the signals for viewing or playing.

Remote control 130 may include a device that allows a user to control programming and/or content displayed on television 110 via interaction with STBs 120 and/or DVR 125. Furthermore, remote control 130 may facilitate interaction with selecting and/or order various content that may be displayed on an interactive media guide (IMG).

User devices 140 may each include a laptop or notebook computer, a personal computer (PC), an ultra mobile personal computer (UMPC), a netbook, or other types of computation or communication devices, threads or processes running on these devices, and/or objects executable by these devices. User device 140 may also include any type of communication device, such as a plain old telephone system (POTS) telephone, a voice over Internet protocol (VoIP) telephone (e.g., a session initiation protocol (SIP) telephone), a wireless or cellular telephone device (e.g., a personal communications system (PCS) terminal that may combine a cellular radiotelephone with data processing and data communications capabilities, a PDA that can include a radiotelephone, or the like), etc a mobile telephone (e.g., a cell phone), a smart phone (e.g., that may combine a cellular radiotelephone with data processing and data communications capabilities), a personal digital assistant (PDA) (e.g., that can include a radiotelephone, a pager, Internet/intranet access, etc. In one implementation, user device 140 may include any device (e.g., an Internet Protocol (IP)-based device) that is capable of accessing services (e.g., Internet services) provided by service provider 150 via network 160. In other implementations, user device 140 may be configured to interact with STBs 120, DVR 125, and/or television 110, via a local network (e.g., a home wired or wireless network). User devices 140 may connect to network 160 via wired, wireless, or optical connections.

Service provider 150 may include one or more computing devices, servers and/or backend systems that are able to connect to network 160 and transmit and/or receive information via network 160. In one implementation, service provider 150 may include a server (e.g., a computer system or an application), a cable head-end, or a broadcaster capable of providing content (e.g., TV programming, movies, on-demand services, live television, news feeds, blog feeds, widgets, applications, etc.), advertisements, instructions, codes, encryption keys, and/or other information associated with products and/or services, etc., to STBs 120 and/or DVR 125. In some implementations, service provider 150 may forward or provide Internet protocol television (IPTV) programming to user devices 140 via network 160. In an exemplary implementation, service provider 150 may be configured to receive programming initially stored on DVR 125 and store the received programming on network storage, as described in detail below.

Network 160 may include one or more wired, wireless and/or optical networks that are capable of receiving and transmitting data, voice and/or video signals, including multimedia signals that include voice, data and video information. For example, network 160 may include one or more public switched telephone networks (PSTNs) or other type of switched network. Network 160 may also include one or more wireless networks and may include a number of transmission towers for receiving wireless signals and forwarding the wireless signals toward the intended destinations. Network 160 may further include one or more satellite networks, one or more optical networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, although three televisions 110, two STBs 120, one DVR 125, one remote control 130, two user devices 140, one service provider 150, and one network 160 have been illustrated in FIG. 1, in practice, there may be more televisions 110, STBs 120, DVRs 125, remote controls 130, user devices 140, service providers 150, and/or networks 160. Network 100 may also include additional elements, such as switches, gateways, routers, backend systems, etc., that aid in routing information, such as media streams between service provider 150 and DVR 125 and/or STBs 120). Network 100 may further include additional elements that aid in managing and optimizing storage space on DVR 125, as described in detail below. Also, in some instances, one or more of the components of network 100 may perform one or more functions described as being performed by another one or more of the components of network 100.

Figure 2:
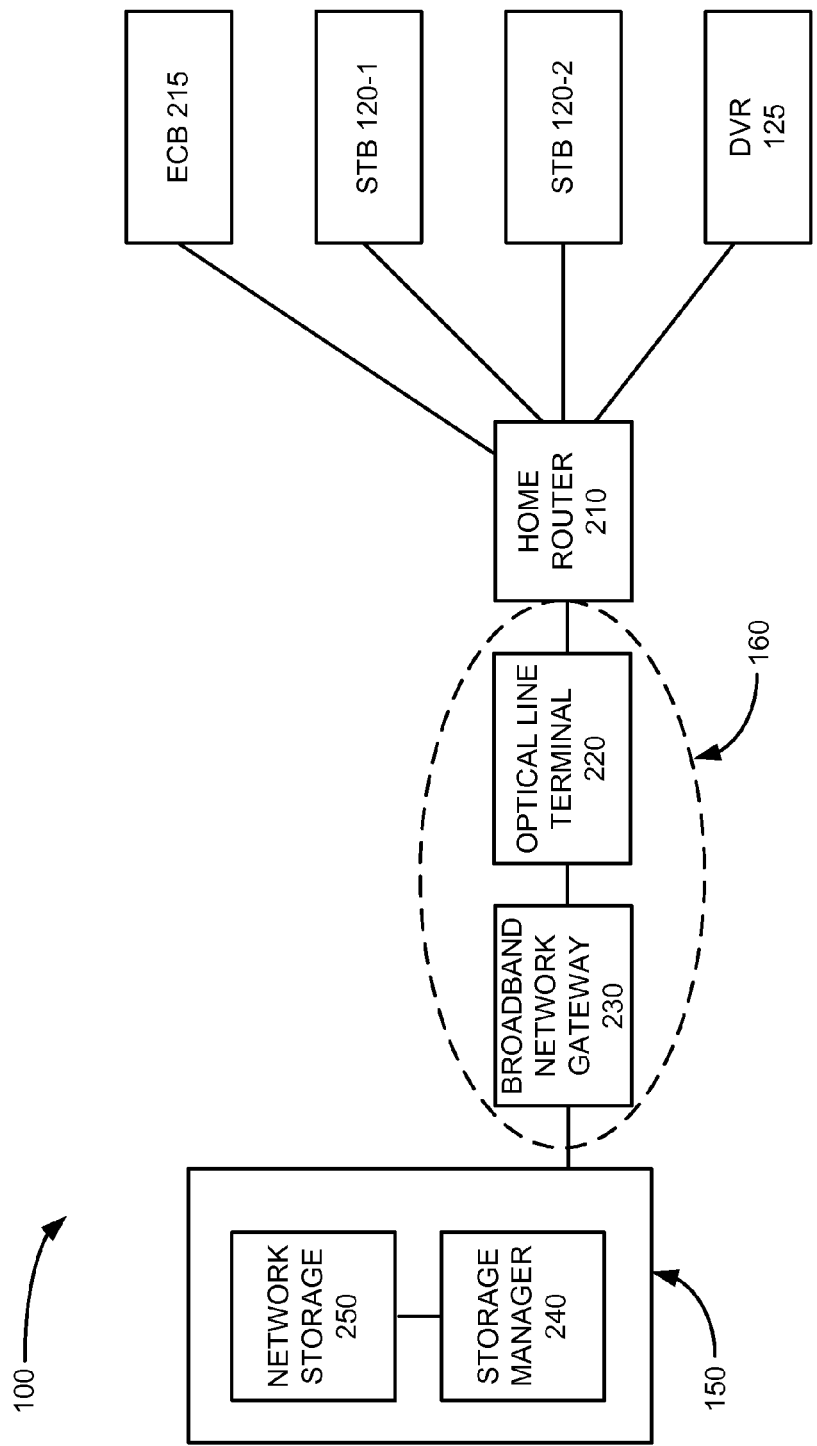
FIG. 2 illustrates an exemplary configuration of components implemented in the network of FIG. 1.

FIG. 2 illustrates exemplary components implemented in a portion of network 100. Referring to FIG. 2, network 100 may include home router 210, Ethernet coax bridge (ECB) 215, optical line terminal (OLT) 220, broadband network gateway (BNG) 230, storage manager 240 and network storage 250. User devices 140 are not illustrated in FIG. 2 for simplicity.

In an exemplary implementation, home router 210, ECB 215, STBs 120 and DVR 125 are located at a customer premises, such as a customer's home. In one implementation, STBs 120 and DVR 125 may be connected to each other and home router 210 via a wired connection, such as a multimedia over coax (MOCA) connection. Other devices in the home network, such as user devices 140, may connect to home router 210 via the MOCA connection using ECB 215 or another wired connection or interface device. Other devices in the home network, such as user devices 140, may also connect to home router 210 via wireless connections (e.g., WiFi, Bluetooth, etc.).

Home router 210, also referred to herein as broadband home router (BHR) 210 or home network gateway (HNG) 210, may act as a hub for communications entering the customer's premises. For example, service provider 150 may communicate with one or more of the devices in a customer's home via network 160 to BHR 210. Similarly, BHR 210 may communicate with one or more devices at service provider 150 and OLT 220 via network 160. In some implementations, BHR 210 may communicate with STBs 120, DVR 125 and user devices 140 (not shown in FIG. 2) to aid in managing storage space on DVR 125, as described in detail below.

ECB 215 may include a bridge or other network device that allows devices in the customer's home/home network to connect to home router 210 using an Ethernet protocol. For example, devices in the customer's home may receive and/or transmit content, such as video, music or multi-media content via ECB 215 using a MOCA connection.

OLT 220 may be located at a central office associated with service provider 150. OLT 220 may interface with BHR 210, optical network terminals (ONTs) and/or other devices (e.g., modems) located at a customer premises. For example, OLT 220 may interface with BHR 210 located at the customer's home. In some implementations, service provider 150 may forward programming to BHR 210 via BNG 230 and OLT 220. In such implementations, OLT 220 may forward optical signals to BHR 210, which may act as an optical network terminal (ONT) for the customer's home network.

BNG 230, also referred to herein as gateway router 230, may be located at service provider 150 or elsewhere in network 100. BNG 230 may facilitate communications between service provider 150 and BHR 210. For example, BNG 230 may transmit media streams from service provider 150 to BHR 210 via network 160. BNG 230 may also receive requests and other information from a customer premises transmitted by BHR 210 via network 160, as also described in detail below.

As described above, service provider 150 may provide content (e.g., TV programming, movies, on-demand services, live television, news feeds, blog feeds, widgets, applications, etc.) to STBs 120 and/or DVR 125. In an exemplary implementation, service provider 150 may include storage manager 240 and network storage 250. Storage manager 240 may store business policy information associated with managing a large number of customer locations (e.g., thousands of customers locations).

For example, in one implementation, storage manager 240 may store information identifying an amount of network storage space that will be used to augment the storage space available on a customer's home DVR (e.g., DVR 125). The amount of network storage space available may be based on various subscription levels associated with the customer. For example, a customer may subscribe to a first level of service that provides 100 gibabytes (100 Gb) of network storage. Alternatively, the customer may subscribe to a second level of service that provides more or less storage (e.g., 200 Gb) of network storage. Different levels of service may be provided based on the particular subscription level. In each case, storage manager 240 may monitor customer locations to provide the appropriate service level associated with network storage 250.

Network storage 250 may include one or more memory devices used to store programming associated with customers. As described above, storage manager 240 may monitor network storage 250 on behalf of customers to ensure that the customer's storage levels within network storage 250 meet the customer's subscribed to service level.

Figure 3:
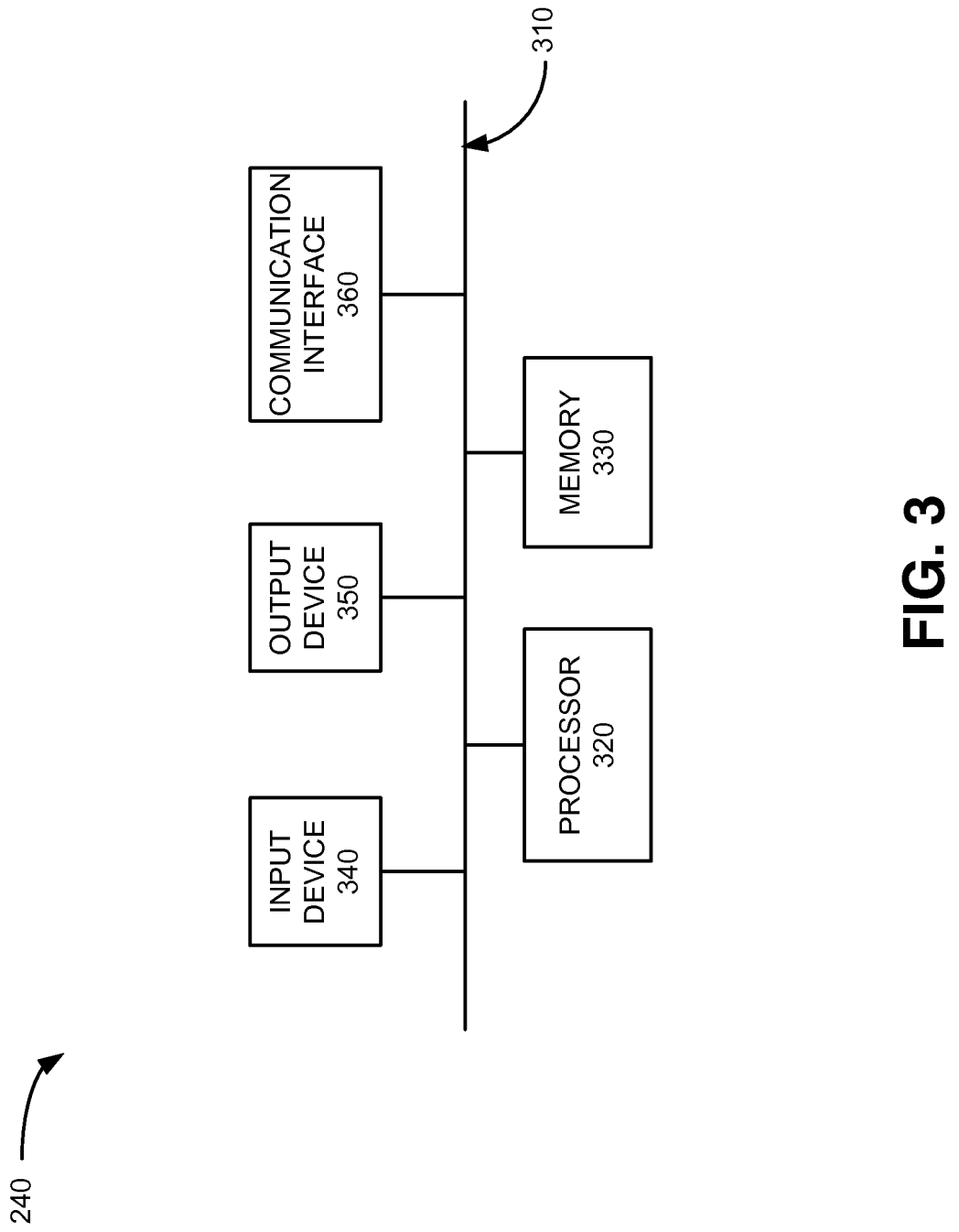
FIG. 3 illustrates an exemplary configuration of one or more of the components of FIG. 2.

FIG. 3 illustrates an exemplary configuration of storage manager 240. One or more of DVR 125, STBs 120, BHR 210, OLT 220 and BNG 230 may be configured in a similar manner. Referring to FIG. 3, storage manager 240 may include a bus 310, a processor 320, a memory 330, an input device 340, an output device 350 and a communication interface 360. Bus 310 may include a path that permits communication among the elements of storage manager 240.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to storage manager 240, such as a keyboard, a keypad, a mouse, a pen, a microphone, a touch screen, voice recognition and/or biometric mechanisms, etc. In the case of DVR 125, input device 340 may also include mechanisms for receiving input via a remote control device, such as remote control 130, which may send commands to DVR 125 via infrared or radio frequency signals. Output device 350 may output information to the user and may include a display, a printer, a speaker, etc.

Communication interface 360 may include one or more transceivers that storage manager 240 may use to communicate with other devices in a customer premises or at service provider 150. For example, communication interface 360 may include mechanisms for communicating with network storage 250, STBs 120, DVR 125, user devices 140, ECB 215, OLT 220 and BNG 230 via wired, wireless or optical mechanisms. Communication interface 360 may also include one or more radio frequency (RF) transmitters, receivers and/ or transceivers and one or more antennas for transmitting and receiving RF data via network 160. Communication interface 360 may also include a modem or an Ethernet interface to a LAN or other mechanisms for communicating via a network, such as network 160 or another network via which storage manager 240 communicates with other devices/systems.

The exemplary configuration illustrated in FIG. 3 is provided for simplicity. It should be understood that storage manager 240 (and one or more of STBs 120, DVR 125, service provider 150, ECB 215, OLT 220, gateway router 230) may include more or fewer devices than illustrated in FIG. 3. For example, various modulating, demodulating, coding and/or decoding components, one or more power supplies or other components may be included in storage manager 240.

Storage manager 240 may perform processing associated with interacting with network storage 250, DVR 125, STBs 120, user devices 140, ECB 215 and/or other devices in network 100. For example, storage manager 240 may perform processing associated with managing storage space provided by DVR 125 and network storage 250 for use by a customer. Storage manager 240 may perform these operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
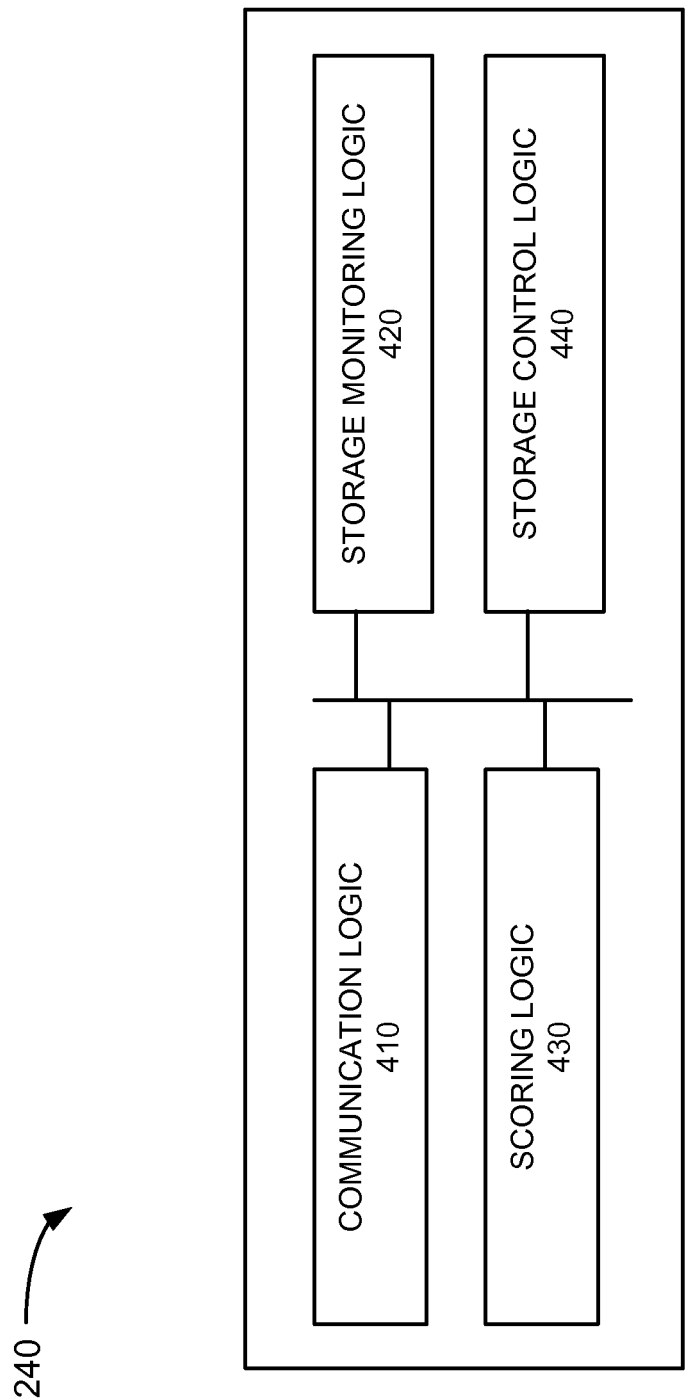
FIG. 4 illustrates an exemplary configuration of logic components implemented in one or more of the devices of FIG. 2.

FIG. 4 is an exemplary functional block diagram of components implemented in storage manager 240 of FIG. 3. In an exemplary implementation, all or some of the components illustrated in FIG. 4 may be stored in memory 330. For example, all of some of the components associated with storage manager 240 may implemented by processor 320 executing software instructions stored in memory 330.

Referring to FIG. 4, storage manager 240 may include communication logic 410, storage monitoring logic 420, scoring logic 430 and storage control logic 440. The various logic components are shown in FIG. 4 as being included in storage manager 240. In alternative implementations, these components or a portion of these components may be located externally with respect to storage manager 240. For example, in some implementations, one or more of the components illustrated in FIG. 4 may be located in devices external to storage manager 240, such as in a central office or other location in network 100. In still other implementations, one of or more of the components illustrated in FIG. 4 may be may be located at STB 120, DVR 125, home router 210, OLT 220 and/or BNG 230.

Communication logic 410 may include logic for communicating with other devices in network 100. For example, communication logic 410 may receive requests from a customer for recording a program via DVR 125 and/or one of STBs 120. Communication logic 410 may also receive a request from DVR 125 for retrieving a program stored on network storage 250. Communication logic 410 may forward these requests to storage monitoring logic 420 and/or storage control logic 440 for further processing.

Storage monitoring logic 420 may include logic for monitoring and managing storage space between the user's home DVR (e.g., DVR 125) and network storage 250 based on various policies stored in (or accessible to) storage monitoring logic 420. For example, storage monitoring logic 420 may store policy information regarding a large number of customers (e.g., thousands or more) serviced by service provider 150, such as subscription levels for the customers. Each subscription level may correspond to a particular amount of storage space available in network storage 250. Storage monitoring logic 420 may update the available storage levels for a customer when he/she changes his/her subscription level. Storage monitoring logic 420 may also monitor storage levels at the customers' locations, such as the amount of storage space available at DVR 125 (e.g., the amount of storage space that is available for new recordings).

Scoring logic 430 may include logic to assign a score to or rank each program stored on DVR 125 and network storage 250. The score may be a numerical value or a relative ranking value. Scoring logic 430 may monitor a number of parameters associated with programming stored on a customer's DVR 125, as well as programming stored on network storage 250 to generate the scores or rankings. For example, scoring logic 430 may monitor a customer's behavior with respect to stored programming to determine the likelihood that a user will watch a recorded program. As one example, assume that a customer has habitually recorded a particular program that is broadcast on Tuesday evening at 8:00 PM for a number of consecutive weeks and watched the program on the following Friday evening. In this case, scoring logic 430 may determine that it is very likely that the customer will watch the most recently recorded Tuesday evening broadcast of the program on Friday evening. Scoring logic 430 may assign a relatively high score (e.g., 100) to the program to indicate that there is a high probability that the program will be viewed within a short period of time.

For video on demand (VoD) programming, scoring logic 430 may access the customer's viewing history with respect to VoD programming previously requested by the customer. For example, if a customer has previously downloaded and recorded a large amount of VoD programming and later watched the programming within a short period of time (e.g., two days or less), scoring logic 430 may assign a high score to stored VoD programming. On the other hand, if the customer's viewing habits indicate that he/she has recorded a large amount of VoD programming and only watched a small percentage of the recorded VoD programming (e.g., 10%), scoring logic 430 may assign a low score the VoD programming (e.g., 15). Scoring logic 430 may also leverage the customer's viewing history with external services accessed by the user, such as Netflix® or another service in which video programming was downloaded, recorded for later viewing and/or viewed at a later time.

Scoring logic 430 may modify the initial scoring of programming over time based on previous recording and viewing history. For example, if a customer has recorded programs associated with a series of programs broadcast on Wednesday's at 9:00 PM, but has not viewed the recorded programs within a relatively long period of time (e.g., two weeks), scoring logic 430 may determine that that is unlikely that the customer will view the most recently recorded episode of the program and assign a relatively low score to the recently recorded episode.

Scoring logic 430 may also periodically update the scoring. For example, if the customer has not watched a recorded program within one week from the date of recording, scoring logic 430 may decrement the score or ranking associated with that program. Scoring logic 430 may, in some instances, increment the scoring for a particular program. For example, if a customer typically records a program at 9:00 PM on Wednesday and watches the program two weeks later, scoring logic 430 may increment the score of that program as time passes to indicate that the customer is more likely to watch the program shortly. This periodic updating may be based on the particular customer's viewing habits/history that is learned over time. That is, scoring logic 430 may constantly "learn" the customer's habits based on his/her viewing history and adjust the scoring based on the viewing history.

Figure 5:
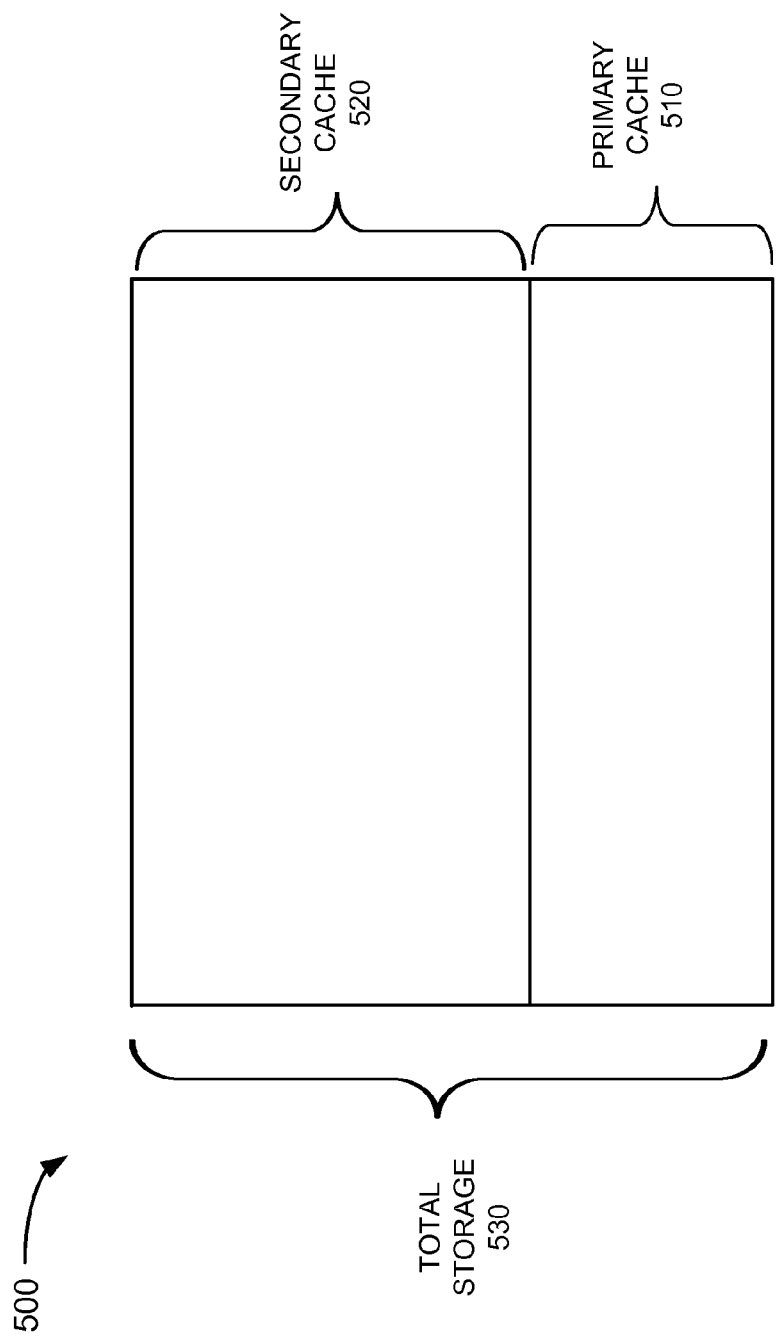
FIG. 5 is a schematic diagram illustrating a logical memory for recording programming.

Storage control logic 440 may include logic that schedules and controls the movement of stored content between DVR 125 and network storage 250. In an exemplary implementation, storage within network 100 may be distributed among two or more storage locations that act as a single logical storage. For example, FIG. 5 schematically illustrates storage 500 that includes primary cache 510 and secondary cache 520. Primary cache 510 may represent storage space on DVR 125 and secondary cache 520 may represent an amount of network storage space provided to the customer via network storage 250. Total storage 530 available to a customer corresponds to the sum of primary cache 510 and secondary cache 520. Storage control logic 440 may move stored programming from primary cache 510 (e.g., DVR 125 storage) to secondary cache 520 (e.g., network storage 250) and vice versa to optimize a customer's use of total storage 530, as well as to minimize download traffic to DVR 125 and upload traffic to service provider 150 during peak traffic times, as described in detail below.

Figure 6:
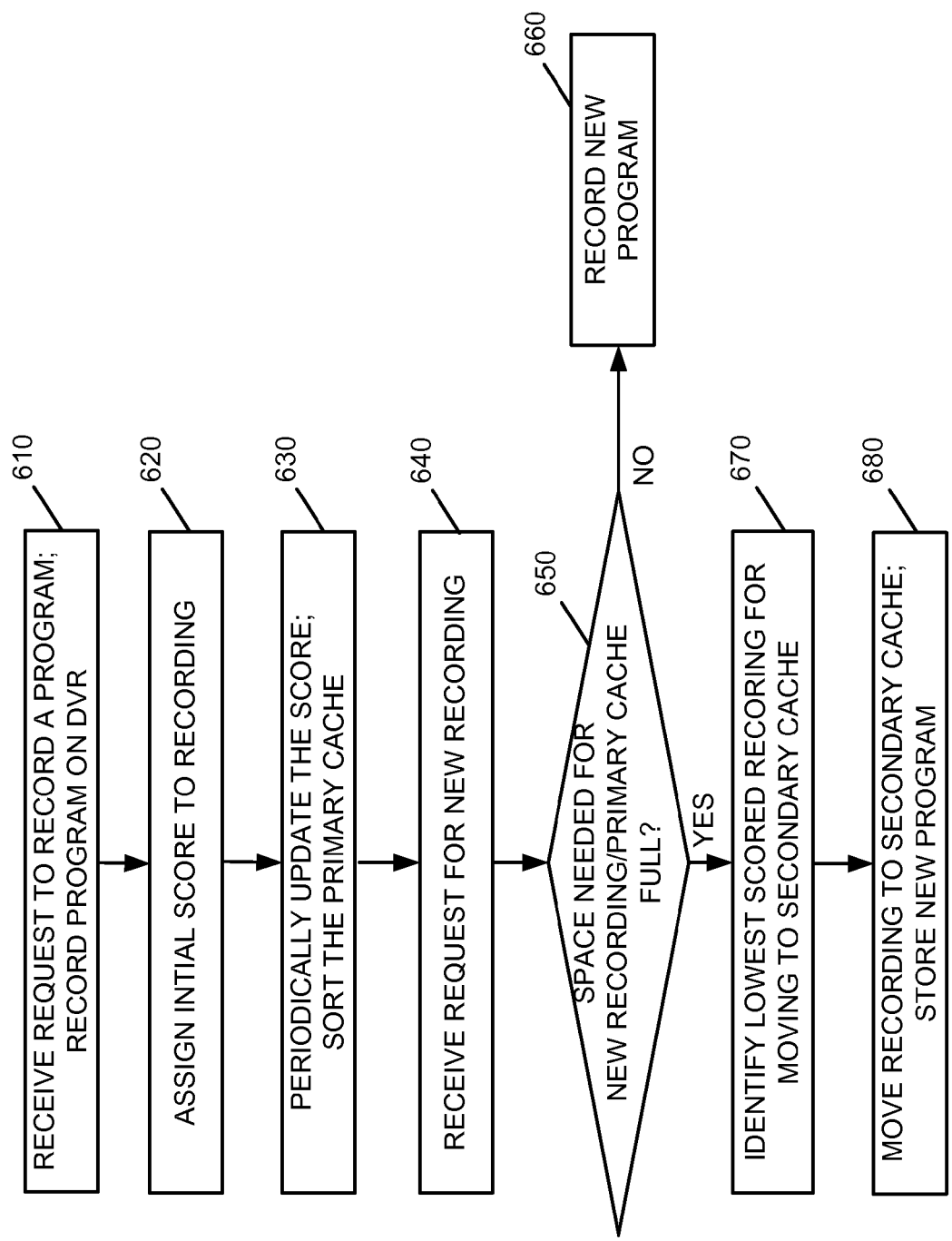
FIGS. 6-8 are flow diagrams illustrating exemplary processing by devices illustrated in FIG. 2 in accordance with exemplary implementations.

FIG. 6 is a flow diagram illustrating exemplary processing associated with network 100. In this example, assume that a customer interacting with DVR 125 would like to record a television program that will be broadcast by service provider 150 at a particular time. Processing may begin with the customer accessing a graphical user interface (GUI) (e.g., an Interactive Media Guide (IMG)) displaying a listing of programs. The customer may scroll or enter information via the GUI that identifies the program that is to be recorded via a remote control (e.g., remote control 130) and press the "record" button. DVR 125 may receive the request and record the program of interest when service provider 150 broadcasts the television program (act 610).

Scoring logic 430 may assign a score to the program stored on DVR 125 (act 620). For example, scoring logic 430 may assign an initial score to the stored program based on a number of factors, such as the likelihood or probability that the customer will watch the program in the near future (e.g., within the next seven days). In an exemplary implementation, assigning a score may involve accessing a log of previous recording and viewing history. For example, as described above, if the recorded program is an episode of a series that the customer has regularly recorded and later watched within a relatively short period of time (e.g., one week or less), scoring logic 430 may assign a relatively high score to the recorded program (e.g., 100). Alternatively, if the customer has recorded a high number of episodes in the series (e.g., recorded all the programs in a series), and has not watched any or watched only a small percentage of the programs within a relatively long period of time (e.g., two weeks or more), scoring logic 430 may assign a relatively low score to the program (e.g., 25).

Scoring logic 430 may monitor the recorded program and periodically update the score assigned to the program (act 630). For example, if the customer has not watched the program within one week from the time that the program was recorded, scoring logic 430 may reduce the initial score by a predetermined amount. Scoring logic 430 may also monitor the recording/viewing history of the customer and if the customer has not watched any recordings for a period of time, scoring logic 430 may reduce the score by another predetermined amount. Still further, if the customer has viewed the program, but not deleted the program, scoring logic 430 may reduce the score to a very low value (e.g., 5). Scoring logic 430 may also sort primary cache 510 based on the scores (act 630).

Assume that the customer makes another request to record a program. For example, DVR 125 may receive a request from a customer via remote control 130 to record a second program (act 640). DVR 125 may determine whether primary cache 510 (i.e., the local memory of DVR 125) includes adequate memory space for storing the newly requested program (act 650). If adequate memory space is available (act 650—no), DVR 125 may record the program when it is broadcast by service provider 150 (act 660). If, however, primary cache 510 does not include adequate memory space (act 650—yes), DVR 125 may signal storage manager 240 that a request for storage exceeding the capacity of DVR 125 has been made.

In this case, storage control logic 440 may identify one or more programs stored on primary cache 510 (i.e., DVR 125) that are to be moved to secondary cache 520. For example, in one implementation, storage control logic 430 may identify the stored program (or programs) in primary cache 510 that has the lowest score or ranking (act 670). The recording having the lowest score may correspond to the program that has the lowest likelihood or probability of being watched in a relatively short period of time (e.g., one week or less).

Storage control logic 440 may signal DVR 125 to move the identified program having the lowest score from primary cache 510 to secondary cache 520 (act 670). In an exemplary implementation, storage control logic 440 may also schedule the upload of the stored content from primary cache 510 to secondary cache 520 for a time when upload network traffic is expected to be lightest. For example, upload network traffic after 11:00 PM may be expected to be lighter than upload network traffic between 7:00 PM and 11:00 PM. In this case, storage control logic 440 may signal DVR 125 to move the recording at the scheduled time and DVR 125 may upload the lowest scored program to secondary cache 520 at the appropriate time (act 680). DVR 125 may then record the newly requested program when it is broadcast (act 680). In this manner, primary cache 510 may free up adequate space to record the newly requested program by moving one or more programs to secondary cache 520. In addition, in situations where the new recording may consume more memory, storage control logic 440 may move more than one program from primary cache 510 to secondary cache 520 to ensure that adequate memory space is available in primary cache 510.

Figure 7:
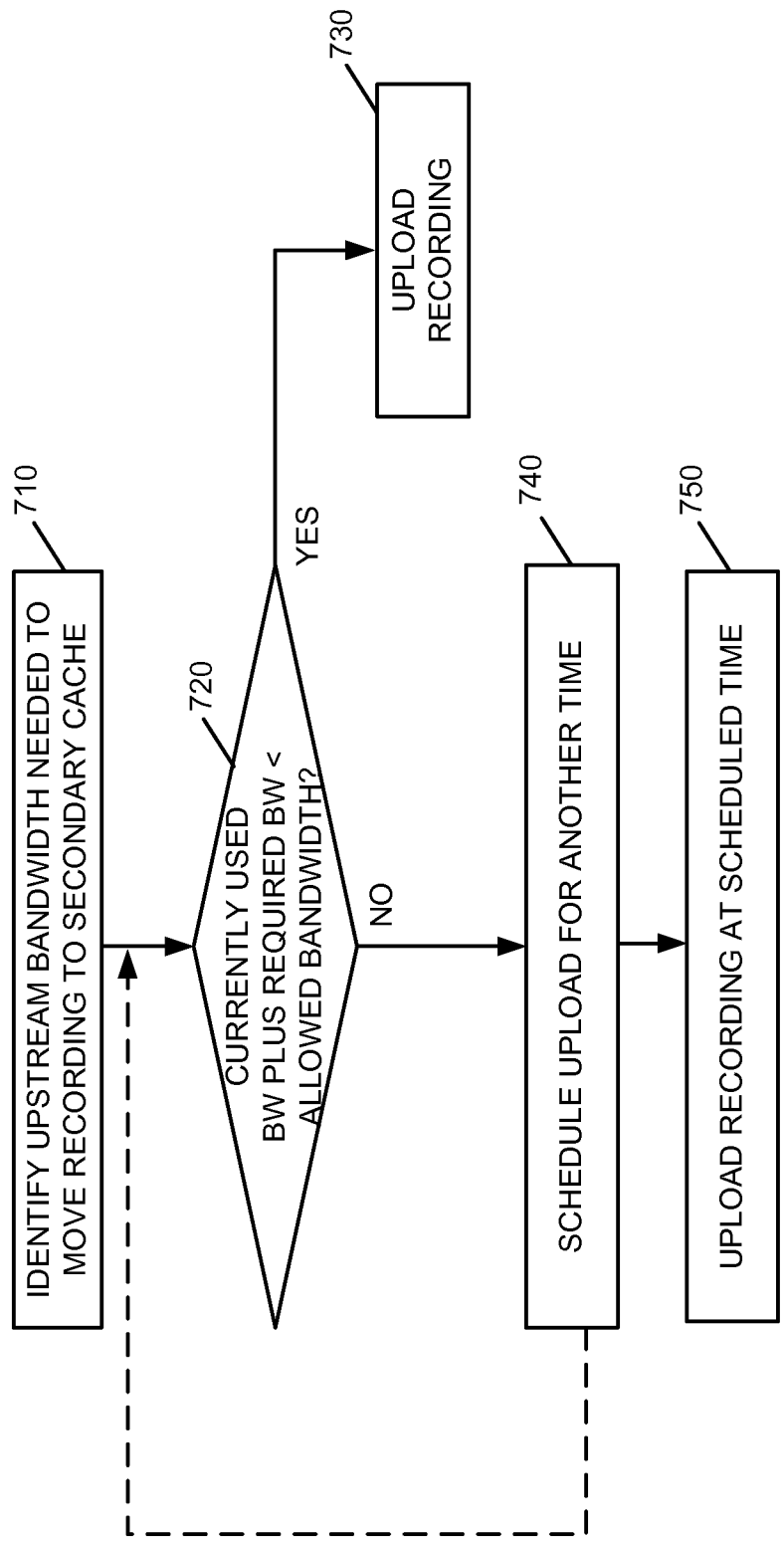

As described above, storage control logic 440 may schedule the movement of programming from primary cache 510 to secondary cache 520. FIG. 7 illustrates exemplary processing associated with scheduling the transferring of stored programming in accordance with an exemplary implementation. Processing may begin with storage control logic 440 identifying the upstream bandwidth requirement needed to transmit the recording from primary cache 510 to secondary cache 520 (act 710). For example, suppose that the recording is a standard definition program that consumes a certain amount of bandwidth to upload (e.g., 4 megabits per second (Mb/s) for 15 minutes).

In this case, storage monitoring logic 420 may determine whether the required upstream bandwidth (i.e., 4 Mb/s for 15 minutes) plus the currently used upstream bandwidth is less than the allowed bandwidth (act 720). For example, if the customer is surfing the Internet and uploading or transferring data files, the customer is consuming a certain amount of upstream bandwidth. If the currently used upstream bandwidth plus the required bandwidth to upload the program is less than the allowed bandwidth for the customer's particular service level (act 720—yes), the program may be uploaded (act 730). That is, the lowest ranked program may be uploaded to secondary cache 520 at the appropriate time.

If, however, the currently used upstream bandwidth plus the required bandwidth is not less than the allowed upstream bandwidth (act 720—no), storage control logic 440 may schedule the upload for another time (act 740). For example, storage control logic 440 may schedule the upload for non-peak time (e.g., after 11:00 PM). Storage control logic 440 may then upload the recording to secondary cache 520 at the scheduled time (act 750). In other implementations, after scheduling the upload for another time at act 740, processing may return to act 720 (as indicated by the dashed arrow in FIG. 7) to determine whether to upload the recording at the newly scheduled time. That is, if the currently used bandwidth at the newly scheduled off-peak time plus the required upstream bandwidth is still greater than the allowed bandwidth, storage control logic 440 may again re-schedule the uploading for another time (e.g., a time most likely to be a non-peak usage time, such as 5:00 AM). In still other implementations, if the currently used upstream bandwidth plus the required bandwidth is not less than the allowed upstream bandwidth, DVR 125 may upload the program at a lower bandwidth (e.g., lower than 4 Mb/s in this example) to avoid consuming a significant part of the customer's upload bandwidth.

In this manner, storage control logic 440 may minimize customer disruption with respect to moving stored programs (also referred to herein as assets or video assets) from primary cache 510 to secondary cache 520. In a similar manner, storage control logic 440 may minimize customer disruption with respect to moving video assets from secondary cache 520 to primary cache 510, as described in detail below.

Figure 8:
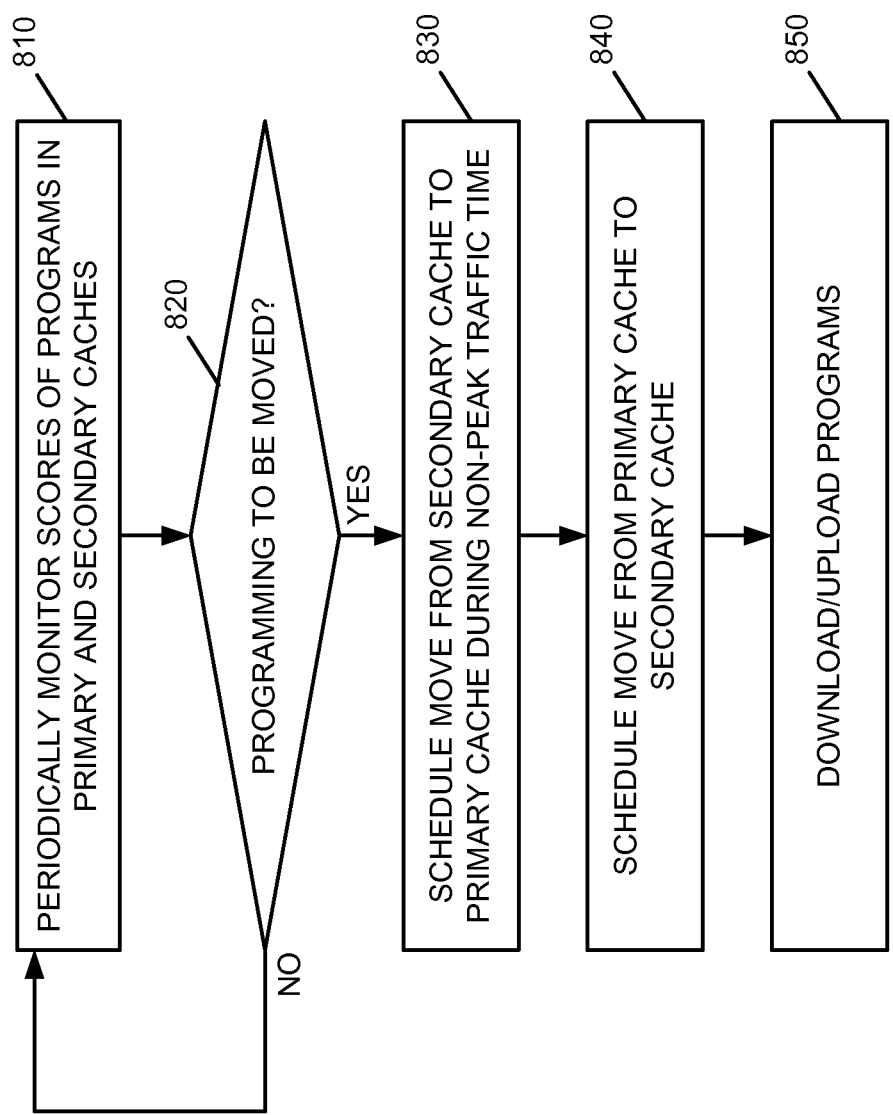

FIG. 8 illustrates exemplary processing associated with moving video assets (e.g., programs) from secondary cache 520 to primary cache 510 via network 160. Processing may begin with storage control logic 440 periodically monitoring scores and/or rankings of programs stored in primary cache 510 and secondary cache 520 (act 810). For example, as described above, scoring logic 430 may periodically update scores or rankings of the programming based on user viewing history. Scoring logic 430 may update the scores of video assets stored in both primary cache 510 and secondary cache 520.

Storage control logic 440 may determine whether any programming should be moved from secondary cache 520 to primary cache 510 and vice versa (act 820). For example, if a video asset stored in secondary cache 520 has a score of 60 and one of the video assets stored in primary cache 510 has a score of 35, storage control logic 440 may determine that the two video assets should be swapped. That is, the video asset with the score of 60 should be moved to primary cache 510 and the video asset with the score of 35 should be moved to secondary cache 520. In this case, storage control logic 440 may schedule the download from secondary cache 520 to primary cache 510 for a non-peak traffic time (act 830). For example, download bandwidth may be a limited resource from service provider 150 to a customer premises via network 160. In some implementations, the amount of download bandwidth available may be based on the customer's subscription level. In each case, storage control logic 440 may schedule the download for a time in which download traffic is expected to be the lightest (e.g., 4:00 AM).

Similar to the discussion above with respect to FIG. 7, storage control logic 440 may schedule the upload from primary cache 510 to secondary cache 520 for a time in which upload bandwidth usage is expected to be low (e.g., a non-peak time) (act 840). Storage control logic 440 may then download the video asset to DVR 125 at the scheduled time and upload the video asset from DVR 125 to network storage 250 at the scheduled time (act 850). In this manner, storage control logic 440 may automatically control the movement of video assets without causing any disruptions or bottlenecks with respect to the customer's other activities. That is, the download will be performed at a time that does not interfere with other download activities (e.g., downloading a VoD program, downloading music, etc.) being performed by the customer.

As described above, assets may be periodically moved between primary cache 510 and secondary cache 520. In an exemplary implementation, storage control logic 440 may monitor primary cache 510 to maintain a certain amount of free space for recording new programming. When the amount of free space in primary cache 510 falls below the threshold amount, storage control logic 440 may schedule a move of one or more assets from primary cache 510 to secondary cache 520. In this manner, primary cache 510 may maintain adequate free space to store new programming to avoid situations in which upstream bandwidth is not adequate to move one or more assets from primary cache 510 to secondary cache 520 at the same time that the customer wants to record a program.

In one implementation, storage control logic 440 may issue a warning to the customer (e.g., an alert via TV 110) when the level of used storage at primary cache 510 is at a certain threshold of capacity (e.g., 80% full). Storage control logic 440 may then request customer permission to upload one or more assets from primary cache 510 to secondary cache 520. In other implementations, the customer may set a user-defined default to allow storage control logic 440 to automatically move assets to secondary cache 520 when the level of used storage at primary cache 510 is at the threshold.

As described above, network storage 250 may include storage space for storing video assets associated with a large number of customers, such as thousands of customers. In some cases, network storage 250 may minimize storage requirements associated with a customer by allowing customers to share assets. For example, if two or more customers have both recorded the same television program, storage control logic 440 may store a pointer to the program in each of the customers' network storage 250, as opposed to storing duplicate copies of the program. However, in the case when content is not shared, network storage 250 may store the actual content. In this scenario, "moving" a shared asset from a customer's home DVR 125 to network storage 250 may actually just require that DVR 125 delete the program and network storage 250 store a pointer to the video asset since the video asset is already in network storage 250. However, "moving" a shared asset in the reverse direction (i.e., from secondary cache 520 to primary cache 510 may require transferring an actual copy of the video asset. In addition, "moving" an asset that only one customer has recorded requires transferring the actual contents, irrespective of direction.

Network traffic in network 100 may also include Internet protocol television (IPTV) traffic provided to a user device (e.g., one of user devices 140) in the user's home network. IPTV is a way of distributing channels/programming over an Internet connection in which a stream is typically transmitted to a common network connection point that a large number of customers share. When customers' paths diverge, the IPTV channel is replicated to deliver individual IP streams to customers' homes. In some implementations, an IPTV stream may be replicated at and multicast from one or more of BNG 230, OLT 220 and BHR 210. Therefore, IPTV consumes network bandwidth in a similar manner as VoD or downloads from network storage 250.

IPTV, however, as opposed to VoD or playback from network storage 250, allows multiple subscribers to view or record an IPTV program and therefore, some segments of the network may multicast the IPTV program (i.e., transmit one copy that devices/processors downstream will replicate for the multiple users). As a result, service provider 150 may multicast the IP channel. However, in some situations, service provider 150 may predict, based on prior viewing history of all customers, that only a few customer are interested in, for example, a prime time IPTV program provided during primetime viewing hours (e.g., 8:00 PM). Further, service provider 150, based on the previous viewing history may predict that each of the few customers record the IPTV program, but do not watch the IPTV program in real time. In this scenario, storage control logic 440 may store the recording of the IPTV program in network storage 250 and not actually multicast the IPTV to each of the few customers interested in recording the program. This may allow service provider 150 to avoid using IP network bandwidth during typically busy traffic times.

In some implementation, network manager 240 may also implement a "start-over TV" service in which a customer wishes to watch an entire program, but has missed at least a portion of the program. For example, assume that a customer at DVR 125 wants to watch a program that airs at 8:00 PM, but does not turn on television 110-3 until 8:10 PM and has also not set DVR 125 to record the program. In this case, start-over TV logic implemented by service provider 150 (e.g., storage manager 240) may send the customer at DVR 125 the entire program from the beginning as a VoD stream. The VoD stream would last the length of the program (e.g., an hour for an hour-long program).

Figure 9:
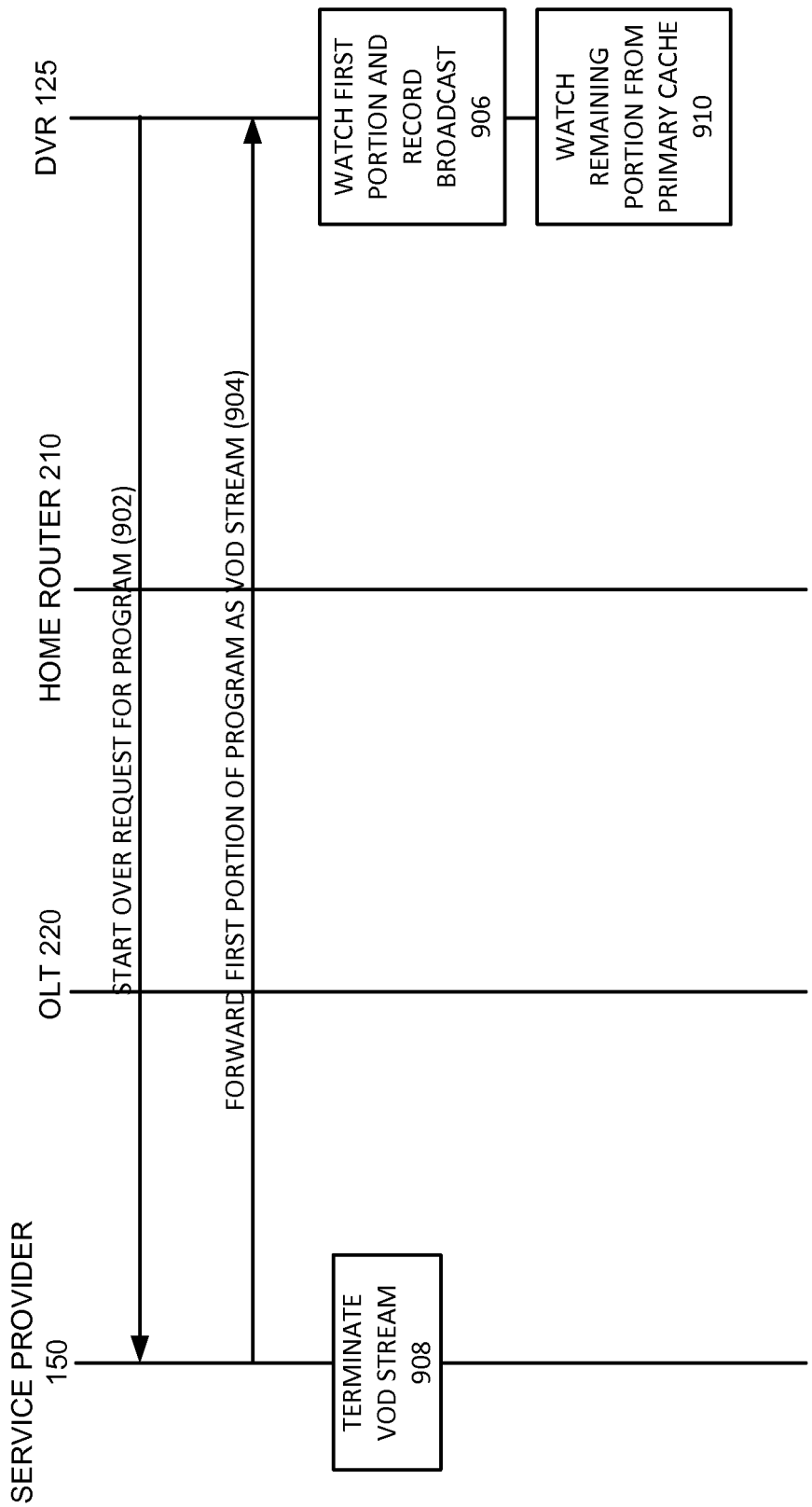
FIG. 9 is an exemplary signal flow diagram associated with processing by various devices illustrated in FIG. 2 in accordance with another exemplary implementation.

However, in some implementations, service provider 150 may limit the duration of the VoD stream to 10 minutes, thereby saving network bandwidth. For example, FIG. 9 illustrates a signal flow diagram associated with a start-over TV service implemented by service provider 150. Referring to FIG. 9, a customer at DVR 125 may forward a start-over bandwidth request 902 to service provider 150. The start-over request may be made via an option on the GUI associated with the program guide provided by service provider 150 and/or a button on remote control 130.

A logic device at service provider 150 that implements the start-over TV service (e.g., storage manager 240) may receive the message. For example, storage manager 240 may receive the message. In response, storage manager 240 may forward, from 8:10 PM to 8:20 PM, the first ten minutes of the program as a VoD stream to DVR 125 (904). The customer would then watch the first ten minutes of the program as a VoD stream (906). Simultaneously with receiving the VoD stream and while the program is being broadcast (e.g., from 8:10 to 9:00 PM), primary cache 510 records the program (906). That is, immediately upon the user's request for start-over TV service, DVR 125 will begin recording the broadcast.

At 8:20 PM, storage manager 240 stops the VoD stream (908). DVR 125 then cuts over to the program stored in primary cache 510 to resume watching the program without interruption (910). In scenarios where primary cache 510 is full upon the request for a start-over TV service, scoring logic 430 may assign the highest possible score (e.g., 100) to the program to ensure that the program is recorded in primary cache 510. Further, if necessary, storage control logic 440 may signal DVR 125 to move a lower scoring video asset out of primary cache 510. In this manner, network manager 240 may provide the entire program to the customer, while minimizing use of network bandwidth.

Implementations described herein manage storage space available for a customer. The storage space may be partitioned into a primary cache and a secondary cache and video assets are moved between the primary and secondary cache based on the likelihood or probability that the video asset will be viewed within a relatively short period of time. In addition, the video assets may be moved to avoid consuming network bandwidth during times of peak customer demand, thereby resulting in little to no disruption to the customer.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, all or some of the decision-making with respect to managing a customer's total storage 530 is described as being performed by network manager 240. In other implementations, some of the decision-making described as being performed at network manager 240 may be performed by another one of these devices or a different device. For example, DVR 125 may perform some or all of the functions described as being performed by network manager 240. In still other implementations, service provider 250 may include a large number of network managers 240 distributed over network 100. In this scenario, each network manager 240 may perform network management services for a predetermined number of customers (e.g., a town, a county, a state, etc.).

In addition, features have been described above with respect to managing storage of video assets. In other implementations, other types of assets, such as music assets, may be managed in a similar manner.

Further, in the implementations described above, programs were described above as being stored on primary cache 510 and secondary cache 520. In other implementations, additional locations may be used to store programs. For example, a customer may subscribe to a level that allows the customer to store or archive programs for a long period of time. In such an implementation, the archival location may act as a customer's video library and scoring logic 430 may not periodically score the programs in the archival location.

In addition, in the implementations described above, storage control logic 440 was described as storing programs in primary cache 510 or secondary cache 520. In situations in which no space is available on either primary cache 510 or secondary cache 520, storage control logic 440 may delete a lowest scored or ranked program from either secondary cache 520 or primary cache 510 to make room for a newly requested recording. In such a situation, storage control logic 440 may send the customer an alert via DVR 125 and/or one of STBs 120 to let the customer know that a program will be deleted to make room for a new recording. In other instances, service provider 150 may send the customer an alert to inquire whether the customer would like to upgrade his/her subscription to allow more network storage 250.

Still further, using various criteria, such as customers' viewing habits/history have been described above with respect to scoring video assets. In other implementations, other criteria may be used to score/rank video assets. For example, information from other sources, such as the customer's Internet surfing/browsing history may be used to augment the scoring. As one example, if a customer blogs about a particular program or visits message boards that discuss a particular program, scoring logic 430 may take this information into consideration and assign a higher score to the program.

In addition, while series of acts have been described with respect to FIGS. 6, 7 and 8, and a series of signal flows have been described with respect to FIG. 9, the order of the acts and/or signal flows may be varied in other implementations. Moreover, non-dependent acts and/or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   storing a plurality of video programs on a digital video recorder (DVR);
   assigning a score or ranking to each of the plurality of video programs based on a viewing history associated with different programs previously recorded on the DVR;
   requesting customer permission to transfer at least some of the plurality of video programs to a secondary storage located remotely from the DVR when a level of used storage at the DVR is at a certain threshold of capacity of the DVR;
   receiving, from a customer and in response to the request, permission to transfer at least some of the plurality of video programs;
   receiving a request to store an other video program on the DVR;
   determining whether the DVR has adequate storage space for the other video program;
   forwarding, when the DVR does not have adequate storage space for the other video program, a first one of the plurality of video programs having a lowest score or ranking to the secondary storage located remotely from the DVR;
   periodically forwarding at least some of the plurality of video programs to the secondary storage based on scores or rankings of the plurality of video programs; and
   periodically forwarding video programming stored on the secondary storage to the DVR based on scores or rankings assigned to the video programming stored on the secondary storage, wherein the DVR is located in a customer's premises and the secondary storage is located externally to the customer's premises.

2. The method of claim 1, further comprising:
   scheduling the forwarding of the first video program to the secondary storage, and wherein the assigning a score or ranking to each of the plurality of video programs comprises:
   assigning a relatively high score to a first one of the plurality of video programs, in response to determining that the viewing history indicates that a user has previously recorded and viewed other programs in a series of programs associated with the first program.

3. The method of claim 2, wherein the scheduling comprises:
   determining upload bandwidth needed to forward the first video program from the DVR to the secondary storage;
   determining, at a scheduled time, whether adequate upload bandwidth exists to forward the first video program; and forwarding the first video program to the secondary storage when adequate upload bandwidth exists.

4. The method of claim 2, wherein the scheduling comprises:
scheduling the forwarding for time when upload activity at a premises associated with the DVR is expected to be relatively low.

5. The method of claim 1, further comprising:
periodically updating the score or rankings of each of the plurality of video programs based on when each of the plurality of video programs was recorded.

6. The method of claim 5, further comprising:
transmitting at least one video program stored on the secondary storage to the DVR based on the updated scores or rankings.

7. The method of claim 6, further comprising:
scheduling the transmission of the at least one video program to the DVR for a time when download activity to a premises associated with the DVR is expected to be low, wherein the secondary storage is not located at the premises associated with the DVR.

8. The method of claim 5, wherein the periodically updating comprises:
identifying viewing habits or viewing history associated with the different programs previously recorded on the DVR; and
updating the scores or rankings based on the viewing habits or viewing history.

9. The method of claim 1, wherein the secondary storage includes a second plurality of video programs, each of the second plurality of video programs having a score or ranking, the method further comprising:
automatically transmitting video programs between the DVR and the secondary storage based on the assigned scores or rankings associated with the plurality of video programs and the second plurality of video programs.

10. The method of claim 1, wherein the forwarding comprises:
forwarding the first video program to the secondary storage located at service provider associated with providing video programming.

11. The method of claim 1, further comprising:
allocating, to a customer associated with the DVR, a first amount of network storage based on a subscription level associated with the customer.

12. A system, comprising:
a memory configured to store a first plurality of video programs associated with a user, the memory being located remotely from a premises associated with the user; and
logic configured to:
assign a score or ranking to each of a second plurality of video programs stored on the user's digital video recorder (DVR) based on a viewing history associated with other programs previously recorded on the DVR,
request user permission to transfer at least some of the second plurality of video programs to the memory when a level of used storage at the DVR is at a certain threshold of capacity of the DVR,
receive, from the user and in response to the request, permission to transfer at least some of the second plurality of video programs, and
initiate transfer of the at least some of the second plurality of video programs between the DVR and the memory based on the scores or rankings and in response to receiving permission.

13. The system of claim 12, wherein when initiating a transfer, the logic is configured to:
identify a video program having a lowest score or ranking, and
signal the DVR to transfer the video program having the lowest score or ranking to the memory.

14. The system of claim 12, wherein the logic is further configured to:
periodically update scores of the first plurality of video programs and the second plurality of video programs based on when each of the first plurality of video programs and each of the second plurality of video programs were recorded.

15. The system of claim 14, wherein when periodically updating the scores, the logic is configured to:
identify viewing habits or viewing history of the user with respect to video programs stored on the DVR, and
update the scores or rankings based on the user's viewing habits or viewing history.

16. The system of claim 12, wherein the system is located at a premises associated with a service provider that provides video programming to the premises associated with the user.

17. A device, comprising:
a memory configured to store a plurality of content requested by a customer, wherein each piece of content has a score or ranking based on the customer's viewing habits or viewing history associated with other content stored in the memory; and
logic configured to:
identify a first piece of content having a lowest score or ranking,
request customer permission to transfer at least some of the plurality of content to an external storage located remotely from the device when a level of used storage in the memory is at a certain level, wherein the at least some of the plurality of content includes the first piece of content,
receive, from a customer and in response to the request, permission to transfer the at least some of the plurality of content, and
forward the first piece of content to the external storage located remotely from the device based on the lowest score or ranking.

18. The device of claim 17, wherein the device comprises a digital video recorder (DVR).

19. The device of claim 17, wherein the logic is further configured to:
periodically forward at least some of the plurality of content from the memory to the external storage based on scores or rankings of the plurality of content, and
periodically receive, from the external storage, content stored on the external storage based on scores or rankings assigned to the content stored on the external storage.

* * * * *